United States Patent Office 2,995,527
Patented Aug. 8, 1961

2,995,527
PROCESS FOR PREPARATION OF LITHIUM ALUMINUM HYDRIDE SUSPENSOID AND PRODUCT THEREOF
John R. Thomas, Lafayette Township, Contra Costa County, and Louis De Vries, Kentfield, Calif., assignors to California Research Corporation, San Francisco, Calif., a corporation of Delaware
No Drawing. Filed Sept. 22, 1958, Ser. No. 762,239
3 Claims. (Cl. 252—428)

This invention relates to a process for the preparation of suspensoids of alkali metal hydrides, herein illustrated by lithium aluminum hydride, and to the resulting product of that process.

It is well known that solutions of lithium aluminum hydride can be prepared. Such solutions are highly reactive, one of their principal uses being a reagent in the reduction of esters to alcohols. It is furthermore well known that upon contacting such a solution of lithium aluminum hydride with an inert aliphatic hydrocarbon liquid that a coarse precipitate of lithium aluminum hydride is formed.

An object of this invention is to prepare a suspensoid of lithium aluminum hydride, such a suspensoid being sufficiently reactive to cause polymerization of polymerizable esters, and yet not so reactive as to cause instead their reduction.

This object has been achieved by adding a small amount of oil soluble polymeric macromolecular dispersant to an inert aliphatic hydrocarbon liquid, thereby causing the formation of semicolloidal particles of lithium aluminum hydride when a solution of lithium aluminum hydride is contacted with the inert aliphatic hydrocarbon liquid containing the dispersant.

Such a mixture is a useful catalyst in the polymerization of esters and nitriles, and is especially useful in the polymerization of alkyl esters of acrylic and methacrylic acids.

This invention embodies the discovery that the addition of a small amount of an oil-soluble polymeric macromolecular dispersant to an aliphatic hydrocarbon solvent causes the formation of a suspensoid of lithium aluminum hydride when a solution of lithium aluminum hydride is added to the dispersant-containing medium. By a suspensoid is meant a semicolloidal solution, the particles in which range in size from about 20 to about 1000 angstroms in diameter, the particles in said solution remaining substantially uniformly dispersed throughout the solvent for a period of at least about one hour. Such a suspensoid can easily be distinguished from the colloid in that no Tyndall effect is observed. A suspensoid can further be distinguished from a suspension by the fact that the solid particles do not immediately separate from the dispersing solvent and settle to the bottom of a container, as contrasted with a suspension in which the solid phase and liquid phases will almost immediately separate so as to leave a clear supernatant liquid above the precipitate, the precipitate and supernatant liquid being separable by decantation, and the like.

A solution of lithium aluminum hydride is prepared by dissolving lithium aluminum hydride in any inert solvent. Solution may be effected by customary means, for example, by refluxing the lithium aluminum hydride with the solvent. The approximate solubility of lithium aluminum hydride in grams per hundred grams of solvent at 25° C. has been disclosed to be as follows:

Diethyl ether _____ 25–30
Tetrahydrofuran _____ 13
Di-n-butyl ether _____ 2
Dioxane _____ [1] 0.1

[1] Finhold, Bond and Schlesinger, J. Am. Chem. Soc. 69, 1199 (1947).

In the process of the aforesaid invention, any inert lithium aluminum hydride solvent can be employed, although diethyl ether and tetrahydrofuran are preferred because of the greater solubility of lithium aluminum hydride in them, thereby permitting the use of smaller volumes of reaction mixtures. For the same reason, it is futhermore preferred to use saturated or nearly saturated solutions of lithium aluminum hydride.

To prepare the suspensoid itself a solution of lithium aluminum hydride, prepared in accordance with the aforesaid procedure, is contacted with a solution of an oil soluble macromolecular polymeric dispersant dissolved in an aliphatic hydrocarbon solvent normally liquid at operating temperatures. As solvents, n-heptane and n-hexane are preferred although, as stated above, any aliphatic hydrocarbon solvent liquid at operating temperatures is entirely satisfactory.

By an oil-soluble polymeric macromolecular dispersant is meant a compound having a molecular weight ranging from about 2000 to 500,000 consisting of about 80–98 percent by weight oleophilic groups, and from about 20–2 percent by weight polar groups. The aforesaid molecular weights are those determined by the standard light scattering method, such as described in D'Alelio, Fundamental Principles of Polymerization, Wiley & Sons, New York, 1952, pages 256 to 267.

A typical polymeric macromolecular dispersant is the following copolymer containing two monomers:

(A) Alkyl methacrylate in which the alkyl groups are mixed alkyl groups containing 12, 13 and 18 carbon atoms each, and
(B) Polyethylene glycol dodecyl ether mono methacrylates in which the polyethylene glycol group has a molecular weight of about 3500.

The ratio of (A) to (B) being approximately 20:1, the molecular weight of said copolymer being approximately 200,000.

Such a copolymer may be prepared in accordance with the means customarily known to the art. For example, said polymers can be prepared by conventional bulk, solution, or emulsion methods in the presence of an addition polymerization initiator. Preferably, however, the copolymerization is effected by an inert organic solvent such as benzene, toluene, xylene, or petroleum naptha in the presence of a free radical-liberating type of initiator such as a peroxy compound, for example, benzoyl peroxide, acetyl peroxide, tertiary butyl hydroperoxide, ditertiary butyl peroxide, dibenzoyl peroxide, or di-tertiary amyl peroxide, or an azo initiator such as 1,1'-azodicylohexane-carbonitrile or α,α'-azodiisobutyronitrile. The catalyst, or polymerization initiator, can be employed in an amount of from about 0.1 to 10%, with a preferred range from about 0.10 to 2%. If desired the catalyst can be added in increments as the reaction progresses. Likewise, additional portions of the solvent can also be added from time to time in order to maintain the solution in a homogeneous condition. The temperature of copolymerization varies from about 170 to 300° F., with the optimum temperature for any given preparation depending on the nature of the solvent, the concentration of monomers present in the solvent, the catalyst, and the duration of the reaction. Much the same conditions are employed when the copolymerization is effected in the presence or absence of an inert solvent.

More detailed information concerning the preparation of these copolymers can be found in U.S. patent applications Ser. Nos. 574,635 and 729,560, filed respectively on March 29, 1956, and April 21, 1958.

Another typical suitable copolymer is a copolymer of an N-vinyl pyrrolidone and at least one acrylic ester, $ROOCC(R^x)=CH_2$, where R is the alkyl portion and $R^x$ is hydrogen or the methyl group, the N-vinyl pyrrolidone supplying 5% to 30% by weight of the copolymer and the ester part of the copolymer having an average of at least 8 carbon atoms in the alkyl portion thereof and supplying solubility in petroleum liquids.

A solution of the oil soluble polymeric macromolecular dispersant dissolved in an inert aliphatic hydrocarbon solvent is then prepared. Amounts ranging from 0.25 to 5% polymeric macromolecular dispersant by volume in terms of aliphatic hydrocarbon solvent are employed, although amounts ranging from 0.25 to 0.75% are preferred. Amounts under 0.25% are generally insufficient to effectively form the suspensoid and the presence of amounts over 5% causes the solution to become so viscous that it is difficult to handle.

The lithium aluminum hydride solution and the oil soluble polymeric macromolecular dispersant solution are then contacted so as to form the suspensoid. The ratio of lithium aluminum hydride in solution to dispersant solution, in terms of grams of lithium aluminum hydride and liters of dispersant solution, can range from 2:1 to 20:1, although ranges of 2:1 to 5:2 are preferred. The ratio by volume of the two solutions is not critical, but it is preferred to employ diethyl ether solutions of lithium aluminum hydride, containing about 20 grams or more of lithium aluminum hydride per 100 grams of solvent, so as to permit the use of smaller volumes of lithium aluminum hydride solution.

The temperature of contacting is not critical so long as the temperature is above the freezing point of the solvent employed and is below its boiling point, although room temperatures are preferred because of convenience of operation.

The mechanism of the formation of the suspensoid is not fully understood but it is evident that the polymeric dispersant has the effect of controlling the size of the lithium aluminum hydride particles.

The preparation of the lithium aluminum hydride suspensoid may better be illustrated by the following examples, which, however, are not meant in any way to limit this invention.

Example 1

200 cc. of n-heptane were placed in a 500 milliliter round bottom flask and were admixed with 10 cc. of a diethyl ether solution of lithium aluminum hydride, said solution containing 20 grams of lithium aluminum hydride per hundred grams of solvent. A precipitate of lithium aluminum hydride immediately formed. The precipitate settled to the bottom so as to leave a clear supernatant liquid above. The liquid and lithium aluminum hydride were easily separated by decantation.

Example 2

200 cc. of n-heptane containing 2 cc. of the oil soluble polymeric macromolecular dispersant hereinabove discussed, namely, the alkyl methacrylate-polyethylene glycol dodecyl ether mono methacrylate copolymer, molecular weight about 200,000, were placed in a 500 milliliter round bottom flask. 10 cc. of a diethyl ether solution of lithium aluminum hydride were added, said solution containing 20 grams of lithium aluminum hydride per 100 grams of solvent was admixed with the n-heptane. A suspensoid was immediately formed. The suspensoid did not exhibit a Tyndall effect. The lithium aluminum hydride particles remained suspended after standing one hour.

Example 3

To the suspensoid formed in Example 2 was added 40 cc. of methyl methacrylate. The temperature was 20° C. Polymer formation occurred immediately as evidenced by heat evolution concomitant precipitation of the polymer. After ten minutes the reaction was quenched with methanol. The yield of polymer was about 20% based on monomer added.

Lithium aluminum hydride suspensoids are useful in the polymerization of certain polymerizable compounds. More specifically, they are, for example, useful in the polymerization of the nitriles and esters of acrylic and methacrylic acids, as is more fully described in copending application Ser. No. 762,259, filed September 22, 1958.

This invention represents a considerable improvement over the art in that it permits the preparation of very finely divided lithium aluminum hydride catalyst, thereby creating a compound having sufficient reactivity effectively to polymerize polymerizable compounds at room temperature, and at the same time not so active as to cause their reduction.

We claim:
1. A process for preparing a lithium aluminum hydride suspensoid which comprises contacting a solution of lithium aluminum hydride in an inert organic solvent with a normally liquid aliphatic hydrocarbon solution of an oil soluble polymeric macromolecular dispersant, the ratio in grams of lithium aluminum hydride to oil soluble polymeric macromolecular dispersant solution per liter ranging from about 2:1 to 20:1, and said aliphatic hydrocarbon solution containing from about 0.25 to 5% dispersant by volume.

2. A process according to claim 1 wherein the ratio of lithium aluminum hydride to polymeric macromolecular dispersant solution ranges from 2:1 to 5:2.

3. A process according to claim 1 wherein the polymeric macromolecular dispersant has a molecular weight of about 200,000.

No references cited.